April 16, 1968 J. H. BEAVERS ET AL 3,377,851
PRESSURE INDICATOR DEVICE
Filed Oct. 7, 1965
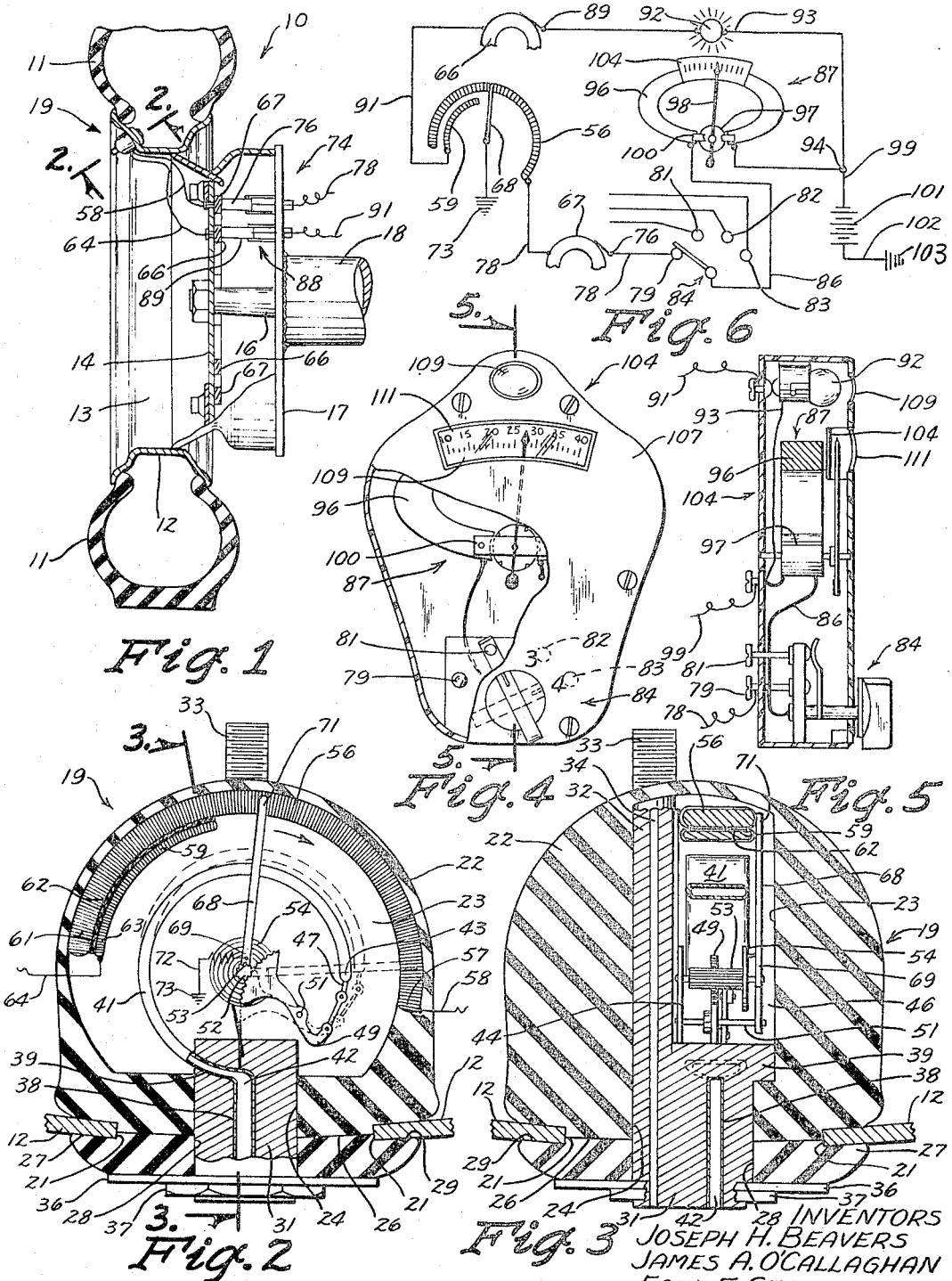
INVENTORS
JOSEPH H. BEAVERS
JAMES A. O'CALLAGHAN
EARL F. SHOAFSTALL
BY
H. Robert Henderson
ATTORNEY

United States Patent Office 3,377,851
Patented Apr. 16, 1968

3,377,851
PRESSURE INDICATOR DEVICE
Joseph H. Beavers, 625 42nd St. 50313; James A. O'Callaghan, 210 6th Ave. 50309; and Earl F. Shoafstall, 305 E. Shawnee 50313, all of Des Moines, Iowa
Filed Oct. 7, 1965, Ser. No. 493,676
2 Claims. (Cl. 73—146.5)

ABSTRACT OF THE DISCLOSURE

This invention relates to a fluid pressure indicator system wherein means are placed in fluid communication with the fluid of that which is to be indicated, and which means includes a member movably responsive to the pressure of the said fluid. Additionally, a pair of rheostat means, insulated each from the other, are made responsive to movement of the member, with a signal means electrically connected to the first rheostat to indicate the pressure of the fluid, and with an alarm means also electrically connected to the second rheostat and operable upon engagement of the member with the second rheostat to indicate either audibly or visibly that a certain pressure of the fluid has been reached.

---

It is an object of this invention to provide an improved fluid pressure indicating device.

Another object of this invention is the provision of an improved device for alerting the operator of a pneumatic tired machine as to the amount of air contained in any tire.

Still another object of this invention is to provide a pressure indicating device which will warn the operator of a pneumatic tired vehicle if the pressure in any of the tires is reduced to a predetermined minimum value.

Yet another object of this invention is to provide a pressure indicating device which can be installed on the wheels of existing vehicles without costly modifications thereto.

A further object of the invention is the provision of a device which will enable the operator of a vehicle to determine from the cab thereof, the air pressure in each tire of the vehicle, while the vehicle is in motion.

It is yet another object of this invention to provide a pressure indicating device which is economical to manufacture, simple and rugged in construction, and effective in operation.

These objects, and other features and advantages of this invention will become readily apparent upon reference to the following description, when taken in conjunction with the accompanying drawings, wherein:

FIG. 1 is a cross sectional view of a vehicular wheel system to which a preferred embodiment of this invention is attached;

FIG. 2 is a front plan view of the gauge and resistor apparatus of this invention, as taken along the line 2—2 in FIG. 1;

FIG. 3 is a sectional view as taken along the line 3—3 in FIG. 2;

FIG. 4 is a front plan view, with part of the cover removed to show the internal structure, of the signal device which is mounted in the cab;

FIG. 5 is a sectional view as taken along the line 5—5 in FIG. 4; and

FIG. 6 is a schematic diagram of the wiring system of this device.

Referring now to the drawings, a wheel assembly is shown generally at 10 in FIG. 1, consisting of a tire 11 mounted on the rim 12 of a wheel 13. The wheel 13 is bolted to a hub 14 which is mounted in the axle 16. The back plate 17 of the hub 14 is welded to the axle housing 18 which encases the axle 16.

One embodiment of the invention, in the form of a tire pressure indicating device, is shown generally at 19 in FIG. 1 mounted on the rim 12. The pressure device 19 is disposed in the opening 21 (FIG. 2) in the rim 12, which normally contains the conventional valve stem through which air is injected into the tire 11.

The main body of the pressure device is a bell shaped housing 22 (FIGS. 2 and 3) having a cavity 23 formed therein. An opening 24 is formed in the housing 22 between the cavity 23 and the housing base 26 as observed in FIG. 2. A dish-shaped base cap 27 having an opening 28 formed therein corresponding to the opening 24, is molded to the base 26, thereby forming a groove 29 which extends around the periphery of the housing 22. In mounting the housing 22 on the rim 12, the base cap 27 extends into the cavity of the tire 11 through the opening 21, and the groove 27 seats on the rim 12, thereby sealing the interior of the tire 11 from the atmosphere.

A plug 31 (FIGS. 2 and 3), having a perimeter corresponding to the perimeter of the openings 24 and 28 and the cavity 23, is inserted into the openings 24 and 28, and extends into the cavity 23. Molded to the top of the plug 31, as shown in FIG. 3, is an elongated cylindrical element 32 that extends outwardly through an opening (not shown) formed in the upper part of the housing 24. A passage 34 is formed through the element 32 and the plug 31, wherein the interior of the tire 11 is fluidly communicable with the atmosphere. A conventional valve (not shown) can be secured to the externally threaded portion 33 of the element 32 to permit inflation and deflation of the tire 11.

The base of the plug 31 (FIGS. 2 and 3) is threaded and a washer 36 and a nut 37 are reciprocally insertable thereon to hold the plug 31 to the housing 22 and the cap 27, and at the same time to provide an airtight seal between the plug 31, and the housing 22 and the cap 27. A first oval aperture 38 (FIGS. 2 and 3) is formed from the base of the plug 31 through a substantial portion thereof. A second oval aperture 39 is formed from the side of the plug 31 which protrudes into the cavity 23, and extends thereinto, whereupon it junctions with the first aperture 38.

A curved, flexible metal tube 41 having an elongated straight base 42, is disposed in the cavity 23 and the two apertures 38 and 39. The tube 41 is fluidly communicable at the base 42 with the interior of the tire 11, and the other end 43 thereof is sealed. A change of pressure in the interior of the tire 11 will cause the radius of the tube 41 to change. An increase in pressure will cause an increase in the radius of the tube 41, as shown by the dotted lines in FIG. 2.

A back plate 44 (FIG. 3) is secured to the plug 31 and extends vertically into the cavity 23. A front plate 46, disposed in the cavity 23, is laterally spaced from the back plate 44. A pair of brackets (not shown) are secured on the ends thereof to the two plates 44 and 46 for the purpose of providing a rigid framework within the cavity 23.

An element 47 (FIG. 2) is secured on one end thereof to the end 43 of the tube 41. On the other end of the element 47 is rotatably mounted one end of a lever 48. On the other end of the lever 48 is mounted a gear 49. The gear 49 is rotatably mounted on a shaft 51 which is mounted on both ends to the plates 44 and 46.

Rotatably mounted in the approximate center of the tube 41 (FIG. 2) and between the plate 44 and plate 46, as shown in FIG. 3, is an axle 52, whose axis of rotation is parallel to the shaft 51. A gear 53, which meshes with gear 49 is mounted on the axle 52. A coil spring 54 is mounted on the axle 52, with one end secured to the axle 52, and with the other end secured to the plate 46.

At the top of the cavity 23, as observed in FIG. 2, a semicircular first rheostat 56 is mounted which is electrically connected on one end 57 thereof to a wire 58. A second rheostat 59 is disposed along the other end 61 of the first rheostat 56, and separated therefrom by an insulating material 62. The end 63 of the second rheostat 59 is electrically connected to a wire 64. The wires 58 and 64 lead through the wall of the housing 22 and electrically communicate with separate annular rings 66 and 67 (FIG. 1) which are mounted in the hub 14 concentrically about the axle 16. The rings 66 and 67 are insulated from each other and from the hub 14.

An arm 68 (FIG. 2) is mounted, on one end 69 thereof, to the axle 52, while the other end 71 is free to move in an arc about the axle 52. The end 69 is electrically connected by a wire 72 to a ground 73. The end 71 of the arm 68 engages rheostats 56 and 59 and is operably slidable thereon by a change of pressure within the interior of the tire 11. The operation of the arm 68 will be described further hereinafter.

Secured to the back plate 17 (FIG. 1) is a first brush assembly 74 consisting of a brush 76 resiliently riding in an electrically conductive brush holder 77. The brush 76 which engages the ring 67 is wired 78 to a contact 79 (FIG. 6) mounted normally in the cab of the vehicle. Similar contacts 81, 82, and 83 are similarly wired to similar pressure devices 19 mounted on the other wheel assemblies 10 of the vehicle. In the event that a vehicle has more than four wheels, additional pressure devices 19 and contacts similar to 79 would be provided. A switch 84, operable to electrically contact each of the contacts 79, 81, 82 and 83, is disposed in the cab of the vehicle and is in turn wired at 86 to a pressure indicator, generally indicated at 87 in FIG. 6.

A second brush assembly 88, identical to the first brush assembly 74, is secured to the back plate 17, wherein the brush 89 riding on the ring 66 is wired at 91 to an alarm 92 mounted in the cab of the vehicle. The alarm 92 is wired at 93 to a battery 101 via a junction 94 and wire 99.

The pressure indicator 87 (FIG. 6) includes a magnet 96, an armature 97 rotatably disposed between the poles of the magnet 96 and an indicator needle 98 mounted on the armature 97. One pole of the magnet 96 is electrically connected to wire 86, while the other pole is wired at 99 to the battery 101 of the vehicle. The battery 101 is wired at 102 to a ground 103. A shunt 100 interconnects the two poles of the magnet 96.

The upper end of the needle 98 as observed in FIG. 6, rotates in an arc about an axis which coexists with the axis of rotation in the armature. An indicator card 104, imprinted with numbers representing the tire 11 pressure, is disposed so that the upper end of the needle 98 will rotate across the face of the card 104.

The pressure indicator 87, contacts 79, 81, 82 and 83, the switch 84, the alarm 92 and the card 104 are all encased in a housing 106. The housing 106 consists of a back plate 107 and a cover 108. The cover 108 has an opening 109 formed therein, whereby the alarm 92 is visible. A semicircular opening 111 is also formed in the cover 108 whereby the card 104 and the upper end of the needle 98 are visible. The housing 106 for the pressure indicator apparatus can be of any design best suited for its use on the dashboard or instrument panel of any pneumatic tired machine such as an automobile, truck, or airplane.

In operation the pressure in the tire 11 reacts on the tube 41 (FIG. 2), wherein, when a high pressure exists, the arm 68 will be positioned as shown by the dotted lines in FIG. 2. Upon placing the switch 84 in the position as shown in FIG. 6, current will flow from the battery 101, through and across the magnet 96 and to the first rheostat 56, whereupon it flows to the end 71 of the arm 68 and therethrough to the ground 73 thus completing the circuit. As little resistance is offered by the rheostat 56 the strength of the magnetic field will be high and the armature 97 and needle 98 (FIG. 6) will rotate to the right, thus indicating a high pressure on the card 104. Upon a decrease in pressure within the tire 11, the arm 68 will be caused to rotate to the left thus increasing the resistance in the circuit, and a corresponding rotation of the needle 98 to the left will be caused because of the reduced magnetic field.

When a predetermined minimum pressure is reached within the tire 11, the arm 68 will have rotated to a position wherein the end 71 thereof will be in contact with both rheostats 56 and 59. Upon this occurrence the current will flow from the arm 68 into the second rheostat 59, and therethrough to the alarm 92 circuit thus activating the alarm 92.

It is apparent from the above disclosure that the pressure indicating device could be fluidly connected to any vessel, such as a tube or tank, or series of pressure vessels, wherein it is desirable to determine the pressure therein.

Although a preferred embodiment of this invention has been described and disclosed hereinbefore, it is to be remembered that various modifications and alternate constructions can be made thereto without departing from the true spirit and scope of this invention as defined in the appended claims.

We claim:

1. A fluid pressure indicator system comprising in combination:
    means fluidly communicable with the fluid and including a member movably responsive to the pressure thereof;
    first rheostat means responsive to said pressure responsive means;
    second rheostat means responsive to said pressure responsive means and insulated from said first rheostat means;
    signal means electrically connected to said first rheostat means and responsive thereto to indicate the pressure of the fluid; and
    alarm means electrically connected to said second rheostat means and operable upon engagement of said member with said second rheostat means.

2. A tire pressure indicator signal system comprising in combination:
    a curved elastic tube fluidly communicable on one end with the interior of the tire, said tube closed on the other end wherein a change in pressure within the tire will cause the radius of said tube to change;
    electrical contact means movably responsive to said tube;
    a power supply;
    a first rheostat engageable by said contact means;
    a second rheostat engageable by said contact means upon the tire pressure reaching a predetermined minimum pressure, said second rheostat insulated from said first rheostat;
    a magnet electrically connected to said power supply and to said first rheostat, wherein the strength of the magnetic field of said magnet is controlled by the resistance condition of said first rheostat;

an armature mounted between the poles of said magnet, wherein the position of said armature is controlled by said magnetic field;

an indicator attached to said armature and responsive thereto, wherein the pressure within the tire is indicated thereby; and alarm means responsive to the resistance condition of said second rheostat, whereby upon the occurrence of a pressure below a predetermined minimum pressure, said alarm means is activated.

References Cited

UNITED STATES PATENTS

| | | | |
|---|---|---|---|
| 2,224,798 | 12/1940 | Pyatt | 73—146.5 |
| 2,755,444 | 7/1956 | Pfeffer | 324—146 |
| 2,817,816 | 12/1957 | Medlar | 324—146 |

LOUIS R. PRINCE, *Primary Examiner.*

D. CORR, *Assistant Examiner.*